June 16, 1942.  W. K. SIMPSON  2,286,937
AIR VENT VALVE
Filed Aug. 4, 1941
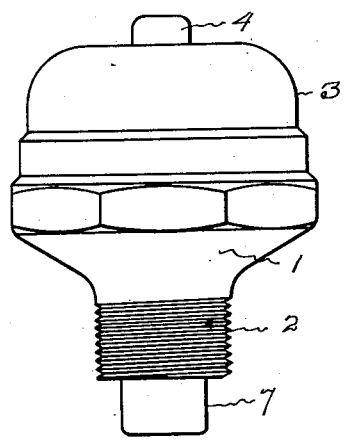
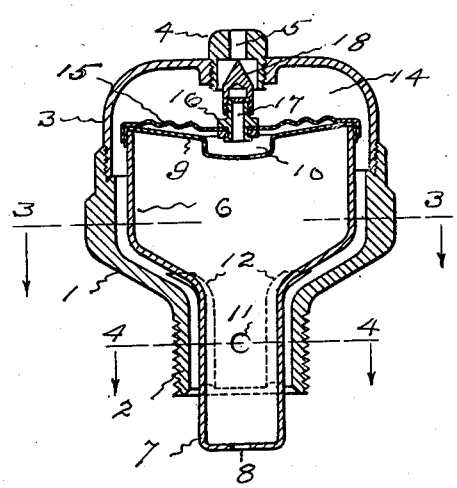
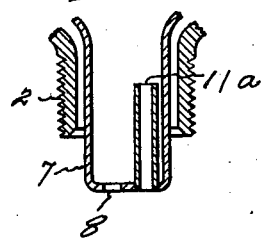
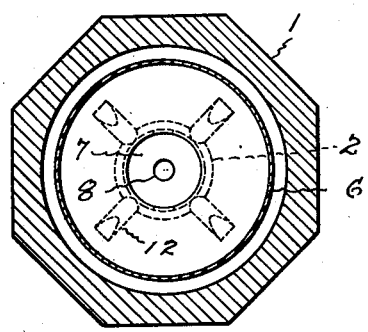
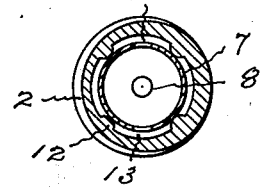
INVENTOR
William K. Simpson
by Harry P. Williams
atty.

Patented June 16, 1942

2,286,937

UNITED STATES PATENT OFFICE 2,286,937

AIR VENT VALVE

William K. Simpson, Waterbury, Conn., assignor to The M. S. Little Manufacturing Company, Hartford, Conn., a corporation of Connecticut Application August 4, 1941, Serial No. 405,291

6 Claims. (Cl. 236—64)

This invention relates to those valves that are designed to be connected to pipes and radiators of steam and vapor heating systems and which function to allow the escape of air from the systems but prevent the outflow or leakage of steam and water. These valves normally have floats that close vent ports upon the entry of water, and have thermostatically operated diaphragms which expand and contract for closing and opening the vent ports upon changes of temperature.

The object of the invention is the production of an efficient durable and inexpensive valve of the type mentioned, and in attaining this object the preferred embodiment is characterized by having a float of comparatively large volume within and relatively small volume without the body of the valve, whereby the amount of water within the valve required to control the float is reduced to a minimum; a float within the body of the valve having an extension without the body which extension serves as a capillary for draining the valve; a float having less buoyancy while opening the vent than while closing the vent, and thus the float will open the vent under relatively higher pressures in the valve than if the buoyancy was the same under all conditions; a float with openings which permit water to enter slowly during a surge or water-hammer in the system and drain slowly when water leaves the valve; a float having openings which ensure substantially equalized pressure within and without the shell and thus the possibility of crushing of the shell if subjected to water-hammer is eliminated; and a thermostatic chamber for receiving volatile fluid, carried by the float, but having no communication with the float chamber.

In the accompanying drawing Fig. 1 shows a side elevation of a vent valve which embodies the invention.

Fig. 2 shows a central vertical section of the same.

Fig. 3 is a horizontal section of the body of the valve on the dotted line 3—3 on Fig. 2.

Fig. 4 is a similar section on the dotted line 4—4 on Fig. 2.

Fig. 5 shows a modification of the lower end of the float.

The body 1 of the valve which is usually cast to shape has at its lower end an exteriorly threaded tubular stem 2 which is designed to be screwed into a pipe or radiator of a steam or vapor heating system. Closing the open upper end of the body and secured thereto preferably by threading is a cap 3. In the top of this cap is a nipple 4 with a vent port 5. The float 6 which is ordinarily formed of thin light metal conforms closely to the interior of the body, having a relatively large interior chamber and a neck 7 that projects through and beyond the lower end of the body stem. The upper end of the float is tightly closed by a thin metal disk 9 which has a reentrant section 10 at the center and the float neck is closed with the exception of a small port 8 at its lower end and a small port 11 at a higher level which may be made through the side wall of the float neck, Fig. 2, or carried up from the bottom by a tube 11a, Fig. 5. In the interior the body at the lower end has inwardly extending ribs 12 which guide and support the float and provide channels 13 between the interior of the body and the exterior of the float from the lower end of the body to the chamber 14 about the float. Above and carried by the float and with its edges tightly secured to the top thereof is a corrugated flexible diaphragm 15. Secured in the center of this diaphragm is a nipple 16 which originally has a bore 17 through which fluid having a relatively low degree of volatilization may be injected into the space between the diaphragm and the top of the float. After the fluid has been injected into this space the bore 17 of the nipple 16 is sealed and a valve pin 18 is screwed onto this nipple in position to be seated against or withdrawn from the vent port 5 in the nipple 4. There is no communication between the fluid chamber and interior of the float.

In use air, steam or water flows up into the valve through the channels 13. If steam enters the heat expands the volatile fluid between the top 9 of the float 6 and the diaphragm 15 and causes the pin 18 to close the vent port 5. When water enters the valve, whether as a result of normal pressure differences, or a surge, or as induced by water hammer, it passes rapidly up through the channels 13 and lifting the float causes the pin 18 carried thereby, to close the vent port 5. As the ports 8 and 11 are relatively small but little water will enter the float during this inflow therefore the buoyancy of the float is approximately the same as if these ports were not provided. With the vent port closed the pressure builds up in the valve and water rises in the float to a height dependant upon the pressure outside of the float. As the water drains from the valve it flows faster around the outside of the neck of the float than from the interior of the float for the channels 13 are of larger area than the ports 8, 11. The maximum buoyancy of the float is effective for lifting the float and causing the pin to close the vent port. As the water drains more slowly through the float ports than through the channels outside of the float the weight of the delayed water in the float is added to the weight of the float consequently the buoyancy of the float is lowered and it will drop and tend to open the vent port quicker and against higher pressure than if there were no ports in the float. When the level of the outflowing water in the valve falls below the upper port II air enters the float and eliminates any tendency to create a vacuum therein and allows the water to drain from the float in a continuous stream through the lower port. The ports in the float minimize the possibility of collapse of the float under water-hammer for with them the external and internal pressures to which the float is subjected is practically equalized, and as there is compressible air above the float and within the float the force of sudden pressures is cushioned. The neck of the float extending through the body renders the provision of the usually employed drain tube unnecessary. In the case of valves of minimum size where it is not practical to have the float itself necked down to a small diameter a tube of small diameter or a rod may be fastened to the float to act as a capillary.

The invention claimed is:

1. A vent valve which comprises a hollow body having at its lower end and integral therewith a tubular stem adapted to be connected with the means to be vented, the opening through said stem forming a continuation of the opening in said body, a cap with a vent port secured to the upper end of the body, a float within and conforming to the interior of the body and having a reduced portion of less exterior diameter than the interior diameter of and extending into said stem and leaving a passage which allows a relatively rapid unrestricted flow of fluid through the stem into and out of the body outside of the float, said float being closed with the exception of two ports of small area, one through the side wall and the other at the bottom, which ports permit a relatively slow flow of fluid into and out of the float, whereby fluid can flow through the stem into and out of the body around the float more freely than into and out of the float and entirely drain from the body, a flexible diaphragm with its edge sealed to the top of the float and providing a chamber for containing volatile fluid between the top of the float and the diaphragm, and a pin extending upward from said diaphragm and adapted to open and close said vent port as the float and diaphragm are affected by the state of the fluid in the body.

2. A vent valve which comprises a hollow body having at its lower end and integral therewith a tubular stem adapted to be connected with the means to be vented, the opening through said stem forming a continuation of the opening in said valve body, a cap with a vent port secured to the upper end of the body, a float within and conforming to the interior of the body and having a reduced portion of less exterior diameter than the interior diameter of and extending into said stem and leaving a passage which allows a relatively rapid flow of fluid through the stem into and out of the body outside of the float, said float being closed with the exception of two ports of small area, one through the bottom end of said reduced portion of the float and the other at a higher level through the reduced portion of the float, which ports permit a relatively slow flow of fluid into and out of the float, whereby fluid can flow into and out of the body around the float more freely than into and out of the float and yet all fluid may drain from the interior of the float as well as from the body about the float, a flexible diaphragm with its edge sealed to the top of the float and providing a chamber for containing volatile fluid between the top of the float and the diaphragm, and a pin extending upward from said diaphragm and adapted to open and close said vent port as the float and diaphragm are affected by the state of the fluid in the body.

3. A vent valve which comprises a hollow body having at its lower end a tubular stem adapted to be connected with the means to be vented, the opening through said stem forming a continuation of the opening in said body, a cap with a vent port secured to the upper end of the body, a float within and conforming to the interior of the body and having a reduced portion of less exterior diameter than the interior diameter of and extending through and below the lower end of said stem and leaving a passage which allows a relatively rapid flow of fluid through the stem into and out of the body outside of the float, said float being closed with the exception of a port of small area through the bottom end of said reduced portion below the lower end of the body stem and a port of small area through the side of said reduced portion above the lower end of the body stem, which ports permit a relatively slow flow of fluid into and out of the float, whereby fluid can flow into and out of the body around the float more freely than into and out of the float and yet all fluid may drain from the interior of the float as well as from the body about the float, a flexible diaphragm with its edge sealed to the top of the float and providing a chamber for containing volatile fluid between the top of the float and the diaphragm, and a pin extending upward from said diaphragm and adapted to open and close said vent port as the float and diaphragm are affected by the state of the fluid in the body.

4. A vent valve which comprises a hollow body having at its lower end a tubular stem with interior ribs, adapted to be connected with the means to be vented, a cap with a vent port secured to the upper end of the body, a float within said body and loosely supported and guided by said ribs and having a reduced portion of less exterior diameter than the interior diameter of and extending into said stem and leaving passages between said ribs which allow a relatively rapid flow of fluid through the stem into and out of the body outside of the float, said float being closed with the exception of a lower port and an upper port, said ports having less aggregate area than the combined areas of the passages between said ribs, through said reduced portion of the float, whereby fluid can flow into and out of the body around the float more freely than into and out of the float and yet fluid may drain from the interior of the float as well as from the body about the float, a flexible diaphragm with its edge sealed to the top of the float and providing a chamber for containing volatile fluid between the top of the float and the diaphragm, and a pin extending upward from said diaphragm and adapted to open and close said vent port as the float and diaphragm are affected by the state of the fluid in the body.

5. A vent valve which comprises a hollow body having at its lower end a tubular stem adapted to be connected with the means to be vented, the opening through said stem forming a continuation of the opening in said body, a cap with a vent port secured to the upper end of the body, a float within the body and having a reduced portion extending into said stem and leaving a passage of relatively large area into and out of the body through the stem outside of the float, said float being closed with the exception of a port of relatively small area through the bottom end of said reduced portion and a port of relatively small area through the side wall above the bottom, allowing fluid to flow into the body about the float more rapidly than into the float and allowing fluid to drain from the body about the float more rapidly than from the float, a chamber for containing voltaile fluid at the top of the float, and a means extending upward from said chamber positioned to open and close said vent port as the float is affected by the state of the fluid in the body.

6. A vent valve which comprises a hollow body having at its upper end a vent port and having at its lower end a tubular stem adapted to be connected with the means to be vented, the opening through said stem forming a continuation of the opening in said body, a float within said body and having a reduced portion of less exterior diameter than the interior diameter of the stem, extending into said stem and leaving a passage which allows a relatively rapid flow of fluid through the stem into and out of the body outside of the float, said float being closed with the exception of a port at its lower end and a port higher up, said ports having less aggregate area than the area of the passage through said stem about the float, whereby fluid can flow into and out of said body outside of the float more freely than into and out of the float, thermostatic means carried at the top of the float and a pin extending upward from said thermostatic means and adapted to open and close said vent at the top of the body as affected by the state of the fluid in the body.

WILLIAM K. SIMPSON.